(12) United States Patent
Fincato et al.

(10) Patent No.: US 7,313,302 B2
(45) Date of Patent: Dec. 25, 2007

(54) OPTICAL RADIATION COUPLING MODULE

(75) Inventors: Antonio Fincato, Cameri (IT); Daniela Barge, San Martino Siccomario (IT); Guido Chiaretti, Novate Milanese (IT)

(73) Assignee: STMicroelectronics S.R.L., Agrate Brianza (Milano) (IT)

( * ) Notice: Subject to any disclaimer, the term of this patent is extended or adjusted under 35 U.S.C. 154(b) by 0 days.

(21) Appl. No.: 11/433,042

(22) Filed: May 12, 2006

(65) Prior Publication Data
US 2006/0263015 A1 Nov. 23, 2006

(30) Foreign Application Priority Data
May 13, 2005 (EP) .................. 05425321

(51) Int. Cl.
G02B 6/26 (2006.01)
G02B 6/36 (2006.01)
(52) U.S. Cl. .............. 385/43; 385/88; 385/89; 385/92
(58) Field of Classification Search .......... 385/33, 385/43, 88–92
See application file for complete search history.

(56) References Cited

U.S. PATENT DOCUMENTS

| 6,062,742 A * | 5/2000 | Yuuki ..................... 385/88 |
| 6,459,835 B1 * | 10/2002 | Nagaoka et al. ........... 385/43 |
| 6,832,861 B2 * | 12/2004 | Kragl ..................... 385/88 |
| 2001/0051027 A1 * | 12/2001 | Matsushita et al. ........ 385/79 |
| 2004/0008952 A1 | 1/2004 | Kragl |
| 2004/0146251 A1 * | 7/2004 | Kudo ..................... 385/88 |

FOREIGN PATENT DOCUMENTS

WO WO 2004/084317 A2 9/2004

* cited by examiner

Primary Examiner—Hemang Sanghavi
(74) Attorney, Agent, or Firm—Hogan & Hartson LLP

(57) ABSTRACT

An optical radiation coupling module includes a waveguide for the propagation of optical radiation, an optoelectronic device arranged on a substrate, and a mechanism for coupling the radiation between the waveguide and the optoelectronic device. The coupling mechanism includes a guiding element moulded and tapered in a radiation propagation direction.

38 Claims, 19 Drawing Sheets

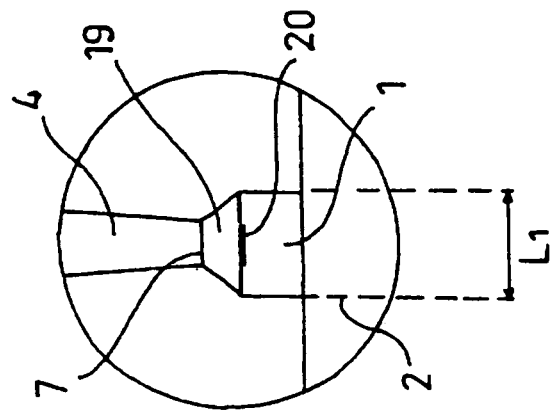
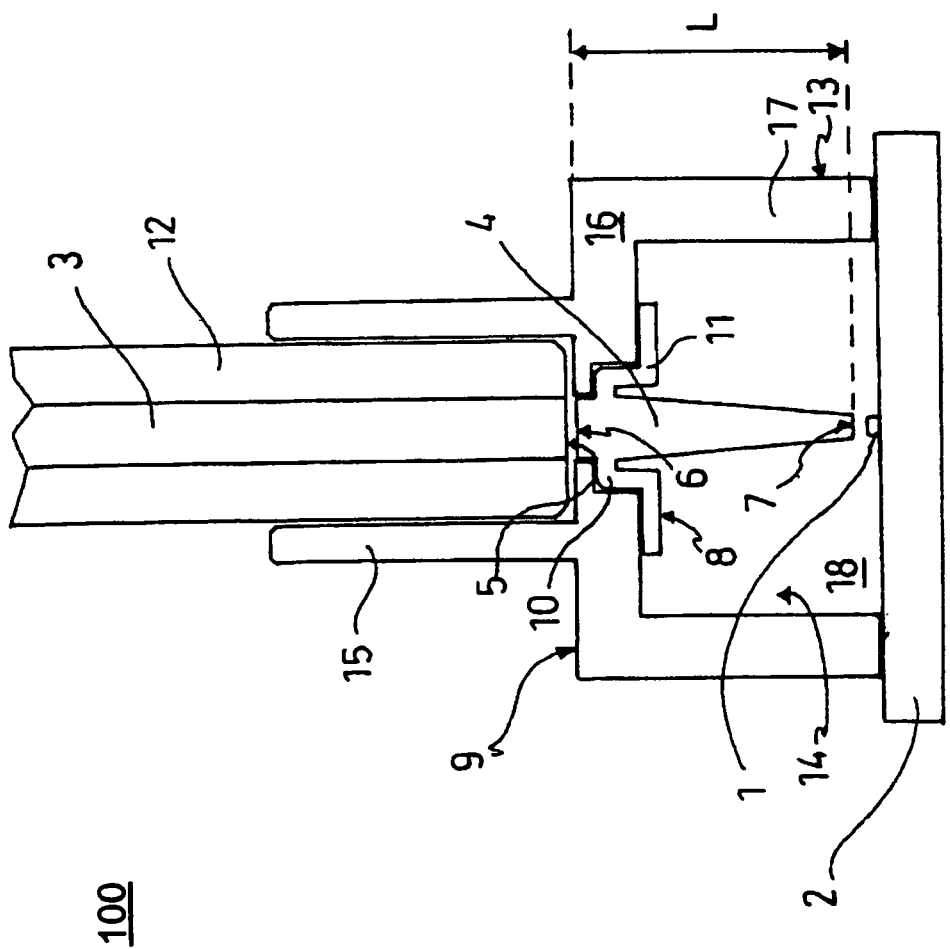

OPTICAL RADIATION COUPLING MODULE

RELATED APPLICATION

The present application claims priority of European Patent Application No. 05425321.6 filed May 13, 2005, which is incorporated herein in its entirety by reference.

FIELD OF THE INVENTION

The present invention relates to an optical module for the coupling of optical radiation between an optoelectronic device and a waveguide.

BACKGROUND OF THE INVENTION

The problem of providing optical structures that obtain a high coupling efficacy between an optoelectronic device (such as an optical radiation emitter or receiver) and a waveguide (such as an optical fibre) has been felt for a long time. Particularly, there are applications such as optical communication requiring an LED (Light Emitting Diode) emitter or diode photo-detector PIN to be coupled with an optical fibre while minimizing the scattered optical power.

To this end, U.S. Patent Publ. No. 2004/0008952A describes a coupling device which includes an LED diode fixed on a substrate and a mechanical coupling body made of plastic with a cavity partially occupied by an optical fibre formed therein. The part of this cavity which is not occupied by the optical fibre has its walls covered with metal and having such a profile as to reflect the radiation emitted by the LED to the optical fibre. The portion of the cavity covered with metal is filled with a clear adhesive that bonds the fibre, thereby holding the same in position.

WO 2004/084317 describes a device having a photodiode mounted on a support structure about which an epoxy, clear body is moulded. It incorporates a lens intended to focus light originating from a fibre on the photodiode.

The coupling optical modules manufactured according to the prior art suffer from drawbacks and restrictions with respect to coupling efficacy (e.g., low tolerance to misalignment), complexity and manufacturing costs.

SUMMARY OF THE INVENTION

The present invention provides an optical module alternative to traditional ones to ensure sufficient coupling efficacy while at the same time being easy and cost-effective to manufacture. This is achieved by a module which includes a waveguide for the propagation of optical radiation, an optoelectronic device arranged on a substrate, and mechanism or device for coupling of the radiation between the waveguide and the optoelectronic device. The coupling mechanism includes a moulded guiding element tapered in a radiation propagation direction.

According to another aspect of the invention, a method of manufacturing an optical module is provided that includes the steps of providing a waveguide for the propagation of optical radiation, providing an optoelectronic device mounted on a substrate, providing by moulding or the like a guiding element for the optical radiation which is tapered in a propagation direction of the optical radiation, and assembling the waveguide, substrate, and guiding element such that the guiding element allows the optical radiation to be coupled between the device and the waveguide.

BRIEF DESCRIPTION OF THE DRAWINGS

In order to better understand the present invention and appreciate the advantages of the same, some exemplary embodiments thereof will be described below, with reference to the annexed figures, in which:

FIG. 1A is a longitudinal sectional side view of a first optical module provided according to a first exemplary embodiment of the invention;

FIG. 1B is a sectional side view of a detail of the first module of FIG. 1A;

DETAILED DESCRIPTION

Figure 2:
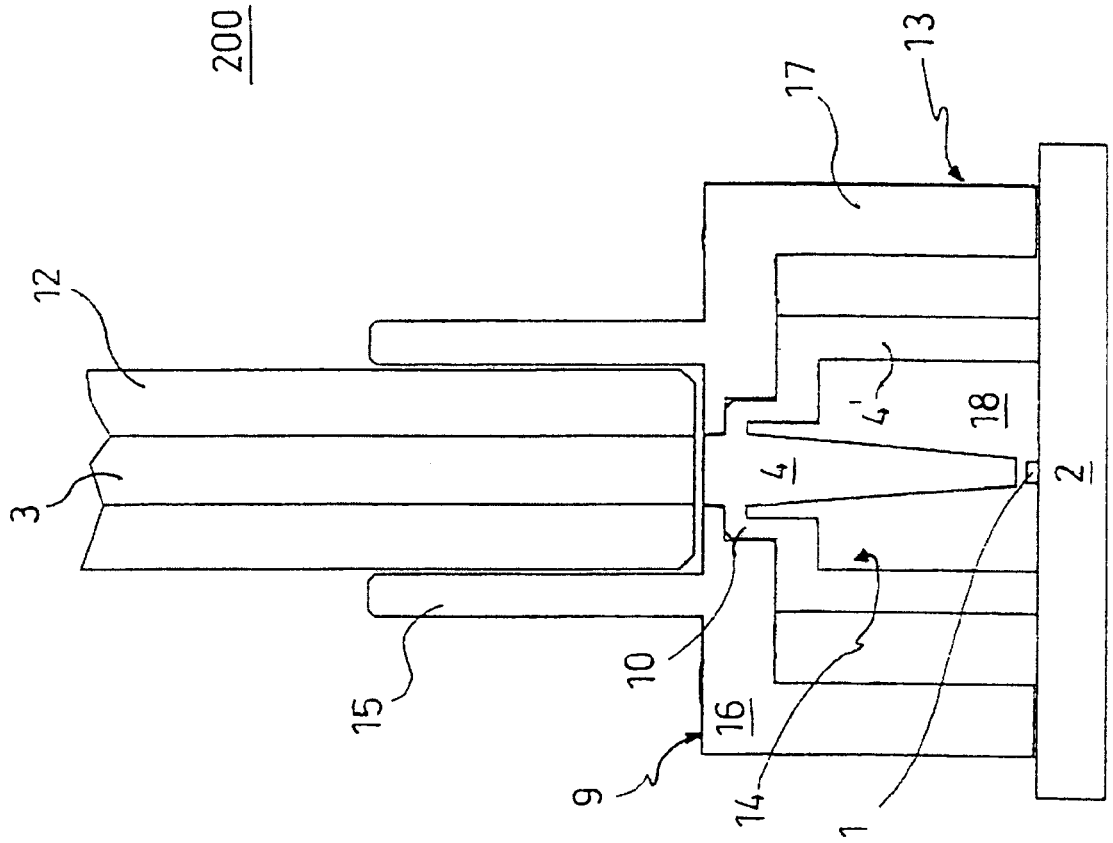
FIGS. 2-9 are longitudinal sectional side views of a second, third, fourth, fifth, sixth, seventh, eighth, and ninth optical module, respectively, which are provided according to various exemplary embodiments of the invention.
Figure 3:
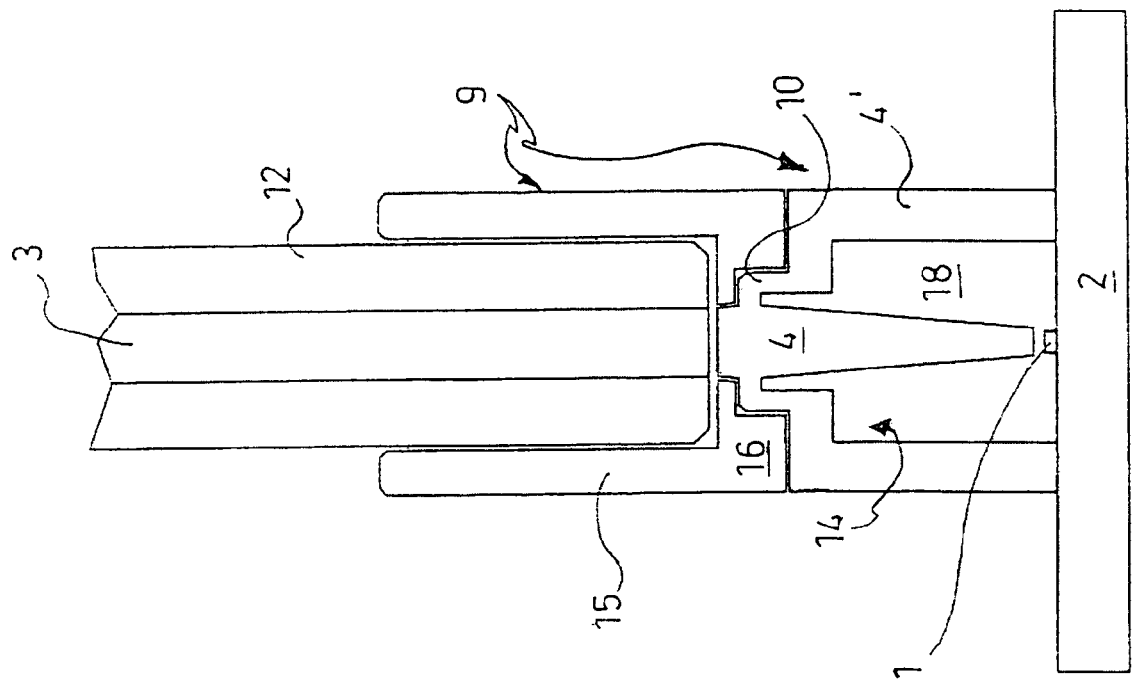

FIG. 1 illustrates a first optical module 100 provided according to a first exemplary embodiment of the invention. The optical module 100 includes an optoelectronic device 1 arranged on a substrate 2, a waveguide 3 for the propagation of optical radiation, and a guiding element 4 for coupling the waveguide 3 to the optoelectronic device 1.

Particularly, the optoelectronic device 1 can be an optical radiation transmitter employed in the field of optical communications. For example, in some embodiments, this transmitter is an LED diode (Light Emitting Diode) of the conventional type mounted on the substrate 1 such that it can emit radiation to the waveguide 3. Other examples of emitting optoelectronic devices useful in the inventive module are RCLED (Resonant Cavity Light Emitting Diode) or VCSEL (Vertical Cavity Surface Emitting Laser). Alternatively, the optoelectronic device 1 is a receiver useful in optical communications made, for example, with a conventional PIN photodiode.

The optoelectronic device 1 is provided with an optical port (i.e., the active area of the receiving or transmitting device), which is designated with numeral 20 in the detail from FIG. 1B, having a predetermined size and facing the waveguide 3. For example, with the optical module 100 of the transmitting type, the device 1 can be an LED with an optical port 20 having a circular plan of about 80 μm diameter (or larger or smaller diameter may be used). With an optical module 100 of the receiving type, the device 1 can be a PIN with an optical port 20 having a circular plan of about 420 μm diameter (or a larger or smaller diameter may be used). The external width $L_1$ of the wall of the optoelectronic device 1 facing the waveguide 3 is, for example with the 80 μm active area LED, 320 μm. Both the LED device and the PIN device can operate at a 650 nm wavelength or other useful wavelength.

The substrate 2, for example made of silicon, is provided with electrical connections (not shown) to supply and electrically control the optoelectronic device 1, and in the case of the receiving device, to supply the received electric signal to the outside of the module. Mounting the optoelectronic device 1 to the substrate 2 can be carried out in any conventional manner, such as but not limited to by a positioning step which is performed, for example, by a pick-and-place apparatus and a fixing step providing the use, for example, of a soldering paste (or conductive resin) and a heat treatment known to those skilled in the art.

Preferably, the positioning and fixing of the optoelectronic device 1 are performed with high precision such that the misalignment loss with the waveguide 3 is minimized. Pick-and-place apparatuses are available, which ensure errors not greater than 20 μm or apparatuses with errors not greater than 12-10 μm. Furthermore, it should be observed that the known pick-and-place apparatuses co-operate with an imaging unit capable of overlapping an image of the surface of the optoelectronic device 1 with an image of the upper surface of substrate 2 according to a predetermined configuration. The orientation of the optoelectronic device 1 can be obtained by overlapping particular signs or "markers" provided on the device 1 with further markers provided on the surface of substrate 2.

The waveguide 3 is, for example, an optical fibre, such as a conventional plastic fibre (for example, a standard Plexiglas fibre), having a port 5 facing the optoelectronic device 1. The optical fibre 3 has, for example but not as a limitation, a 980 μm diameter core and a 1 mm outer cladding. It should be observed that, according to the example described, the optical port 5 of the fibre 3 has a different diameter, particularly the upper one, as compared with the optical port 20 of the optoelectronic device 1 (for example, 80 μm in the case of an LED).

Advantageously, at least one end portion of the optical fibre 3 is housed in a ferule 12 that is of the conventional type, and for example, made of metal. The guiding element 4 is a moulded body, e.g., obtained by moulding, and has a tapered shape, e.g., it has a dimension varying in the direction of propagation of the optical radiation.

According to the example as shown in the figures, this guiding element 4 has a main body having a substantially truncated-cone shaped longitudinal section having a refractive index allowing the element 4 to guide the optical radiation propagating in the optical fibre 3. The guiding element 4 can have a linear, parabolic, or high order tapering. Materials useful for making the guiding element 4 are, for example, Plexiglas, fluoropolymers, polycarbonates, or mouldable glass. An example manufacturing process for the same is described below.

The guiding element 4 is interposed between the optical port 5 of the fibre 3 and the optical port of the optoelectronic device 1. The element 4 has a rectilinear propagation axis and allows the outgoing optical radiation from fibre 3 to be conveyed to the optical port of the device 1 and/or vice versa. Particularly, the guiding element 4 is provided with an optical port 6 of a greater diameter and an optical port 7 of a smaller diameter. The port 6 of a greater diameter faces the port 5 of the fibre 3 and the port 7 of a smaller diameter faces the port of the optoelectronic device 1.

Due to the tapered shape of the guiding element 4, the percentage of electromagnetic radiation emitted by the optoelectronic device 1 (e.g., in the case of an LED emitter) and which is not coupled to the fibre 3 can be decreased. The material used for manufacturing the guiding element 4 is transparent to electromagnetic radiation and has, for example, a refractive index ranging between that of the core of the optical fibre 3 (e.g., 1.49) and that of the active area of the optoelectronic component 1 (e.g., 3 to 5 or about 3.5). With reference to the exemplary sizes indicated above for the device 1 and the fibre 3, the guiding element 4 can have the exemplary (but not limiting) sizes indicated below:

in the case of module 100 of the transmitting type (e.g., the device 1 is an LED): length L of 6900 μm, diameter of the optical port 7 of 240 μm, and diameter of the optical port 6 of 980 μm; and in the case of module 100 of the receiving type (e.g., the device 1 is a PIN): length L of 5500 μm, diameter of the optical port 7 of 410 μm, and diameter of the optical port 6 of 980 μm.

The guiding element 4 also includes a fixing flange 8, made as enbloc with the truncated-cone shaped body, which is intended to be mechanically coupled with a support structure 9. The fixing flange 8 can have, for example, a circular plan and include a first ring 10, of a smaller radius, the flange 8 being joined, by a shoulder to a second ring 11, of a greater radius.

The support structure 9 is mechanically connected both to the fibre 3 and the substrate 2 such as to support the fibre 3. This support structure 9 includes a lower frame 13, for example of a tubular shape, defining an inner region 14, the guiding element 4 extending therein, and to which the optical port of the optoelectronic device 1 is faced.

The frame 13 is provided with a disc-shaped wall 16 (parallel to the substrate 2) to which a first cylindrical wall 17 is joined, which laterally defines the inner region 14. The disc-shaped wall 16 is drilled in the middle region such that the guiding element 4 can be fitted thereto, the optical port 6 thereof facing the port 5 of the optical fibre 3. The drilled region of the disc-shaped wall 16 is shaped such that a geometrical coupling can be provided between the flange 8 and the guiding element 4. Fixing the guiding element 4 to the disc-shaped wall 16 can be performed, for example, by bonding.

Furthermore, the support structure 9 includes a second portion 15 (preferably, made as en bloc with the first portion 13) such as to be engaged with the optical fibre 3 by suitable mounting techniques. Particularly, this second portion 15 includes a second cylindrical wall extending from the disc-shaped element 16 in the direction opposite the direction of extension of the first cylindrical wall 17. The cylindrical wall of the second portion 15 defines a housing region in which the ferrule 12 can be inserted, which embeds the fibre 3 such as to support and hold the same in an aligned position relative to the guiding element 4. The support structure 9 can be made by moulding, for example, of metal or "black" plastic material, e.g., a material opaque to optical radiation.

For example, in the assembly of the optical module 100 after the guiding element 4 has been fixed and fitted to the support structure 9, the structure 9 is fixed to the substrate 2 on which the optoelectronic device 1 had been previously fixed. Fixing the support structure 9 to the substrate 2 can be done by soldering, or preferably, by bonding. Bonding is preferred, since it avoids any thermal stress to the device 1 being fixed to the substrate 2.

It should be observed that the positioning of the support structure 9 on the substrate 2 can be advantageously carried out by a pick-and-place apparatus under control of a photo camera operating based on markers being provided on the two surfaces to be put in front of each other. This positioning step can be carried out in a passive manner, e.g., with the optoelectronic device 1 inactivated and without taking measurements relative to the optical coupling between the guiding element 4 and the device 1.

The inner region 14 as defined by the cylindrical wall comprises a component 18 transparent to radiation and arranged directly in contact with the guiding element 4 and having a lower refractive index than the guiding element, in order to substantially restrict the radiation to the guiding element. Preferably, the transparent component or mechanism 18 filling the inner region 14 is air (which has a refractive index of 1). As an alternative to air, a resin having a lower refractive index than the guiding element 4, for example 1.4, can be used. For example, this resin 18 is a fluoropolymer. The resin 18 can be inserted between the substrate 2 and the support structure 9 being already provided with the guiding element 4 and then optionally left to polymerize.

It should be observed that by using air or transparent resin 18 having a lower refractive index than the guiding element 4, the optical radiation can be substantially confined within the guiding element, without requiring the provision of reflecting surfaces conveying the radiation to the optical port 5 or the optical port 20 of the optoelectronic device 1.

Between the optical port 5 of the fibre 3 and the optical port 6 of the guiding element 4 and the optical port 7 of the guiding element 4 and the optical port 20 of the device 1 there can be interposed air (such as shown in FIG. 1A) or an optical coupling element 19 such as shown in FIG. 1B. Preferably, the optical coupling element 19 joining the optical port 7 to the optical port 20 of the optoelectronic device 1 can be made of a transparent resin that may have a refractive index near or equal to the guiding element 4. This coupling element 19 can be, for example, an epoxy or silicone resin, a gel, or fluoropolymer.

Due to surface tension, the transparent coupling element 19 takes such a shape as to act as a joining element between the guiding element 4 and the optoelectronic device 1. In fact, this element or resin 19 adapts to both ends at the optical port of the guiding element 4 and the exposed surface $L_1$ of the optoelectronic device 1. In addition, the provision of a coupling element 19 with a greater refractive index than air (for example, of 1 to 5 or about 1.5) significantly increases the extraction of photons from the surface 20 of the LED. Between the optical port 5 of the fibre 3 and the optical port 6 of the guiding element 4 there can be also interposed air or a transparent joining element (not shown) similar to the coupling element 19 described above.

The module 100 can advantageously include an outer enclosure (not shown) such as to provide a Faraday cage, thereby shielding the electronic circuitry integrated on the substrate 2 against external electromagnetic interferences. Such a shielding enclosure has, for example, a shape following that of the support structure 9 and is typically made of metal. This enclosure can either be made as a separate body or by coating a metal layer (for example by sputtering or evaporation) on the outer surface of the support structure 9.

FIGS. 2 to 9 show second 200, third 300, fourth 400, fifth 500, sixth 600, seventh 700, eighth 800, and ninth 900 optical module provided according to embodiments of the present invention alternative to that from FIG. 1. In these FIGS. 2-9, the elements identical or similar to those described with reference to FIG. 1 are designated with the same numerals and will not be further detailed. With reference to FIGS. 2-9, several unique aspects of the relative optical modules will be indicated below.

The second 200, third 300, fourth 400, fifth 500, sixth 600, eighth 800, and ninth 900 modules differ from the first module 100 in that they are such as to have the respective guiding element 4 being provided as enbloc with a support body or wall 4' of the guiding element. Particularly, the support wall 4' has a rectangular plan (though it may even have an irregular plan, due to problems related with the bulk of other electronic chips being also mounted on the support 2), has the function of supporting and aligning the guiding element, and defines the inner region 14 in which there is arranged the transparent component or medium 18. According to the example illustrated, the support walls 4' are joined to the guiding element 4 by means of the shoulder 10. The support wall 4' is such as to be mechanically coupled with the substrate 2 such that the guiding element 4 is supported and held at the proper height relative to the optical port 20 of the optoelectronic device 1.

The solutions illustrated in FIGS. 2, 3, 4, 5, 6, 8, and 9 are particularly advantageous because they allow the positioning error of the guiding element 4 relative to the first optical module to be further reduced, since the latter is independent from the mounting step of the guiding element 4 and the support structure (if provided) of the optical fibre 3. The positioning of the support wall 4' as enbloc with the guiding element 4 can be carried out by a pick-and-place apparatus in a similar manner as described above with reference to the support structure 9. For the optical modules of FIGS. 2, 3, 4, 6, 8, and 9, the support wall 4', made as enbloc with the guiding element 4, has a base surface directly fixed to the substrate 2 by soldering, or preferably, bonding.

The fifth optical module 500 (FIG. 5) is such that the support wall 4' made as enbloc with the guiding element 4 is mechanically connected to the substrate by means of a body 21 opaque to optical radiation (for example, a resin).

In addition to the support wall 4', the guiding element 4 of the fourth optical module 400 (FIG. 4) is also provided as enbloc with a mounting element 4" (also of a tubular shape) which is intended to be mechanically coupled with the ferrule 12 of the optical fibre 3 for the latter to be held in the aligned position with the guiding element 4. The tubular mounting element 4" defines, similarly to the tubular wall 15 from FIG. 1, a housing seat for the ferrule 12 to be inserted therein, such that the fibre 3 is aligned with the guiding element 4. Accordingly, the support wall 4' and the tubular mounting element 4" of fourth module 400 are a single support structure 9' both for the guiding element 4 and the optical fibre 3 being provided with ferrule 12.

With further reference to the optical modules from FIGS. 2, 3, 4, 5, 6, 8, and 9, it should be observed that the support wall 4' and, if provided, the mounting element 4" can be made by moulding with the transparent materials stated above for the guiding element 4 of the first module 100.

It should be observed that the support structure 9' of the fourth module 400 and the cylindrical wall 4" of the third optical module 300 are advantageously shielded with a suitable outer covering (not shown) that is opaque to optical radiation, for example made of plastic or metal.

Figure 7:
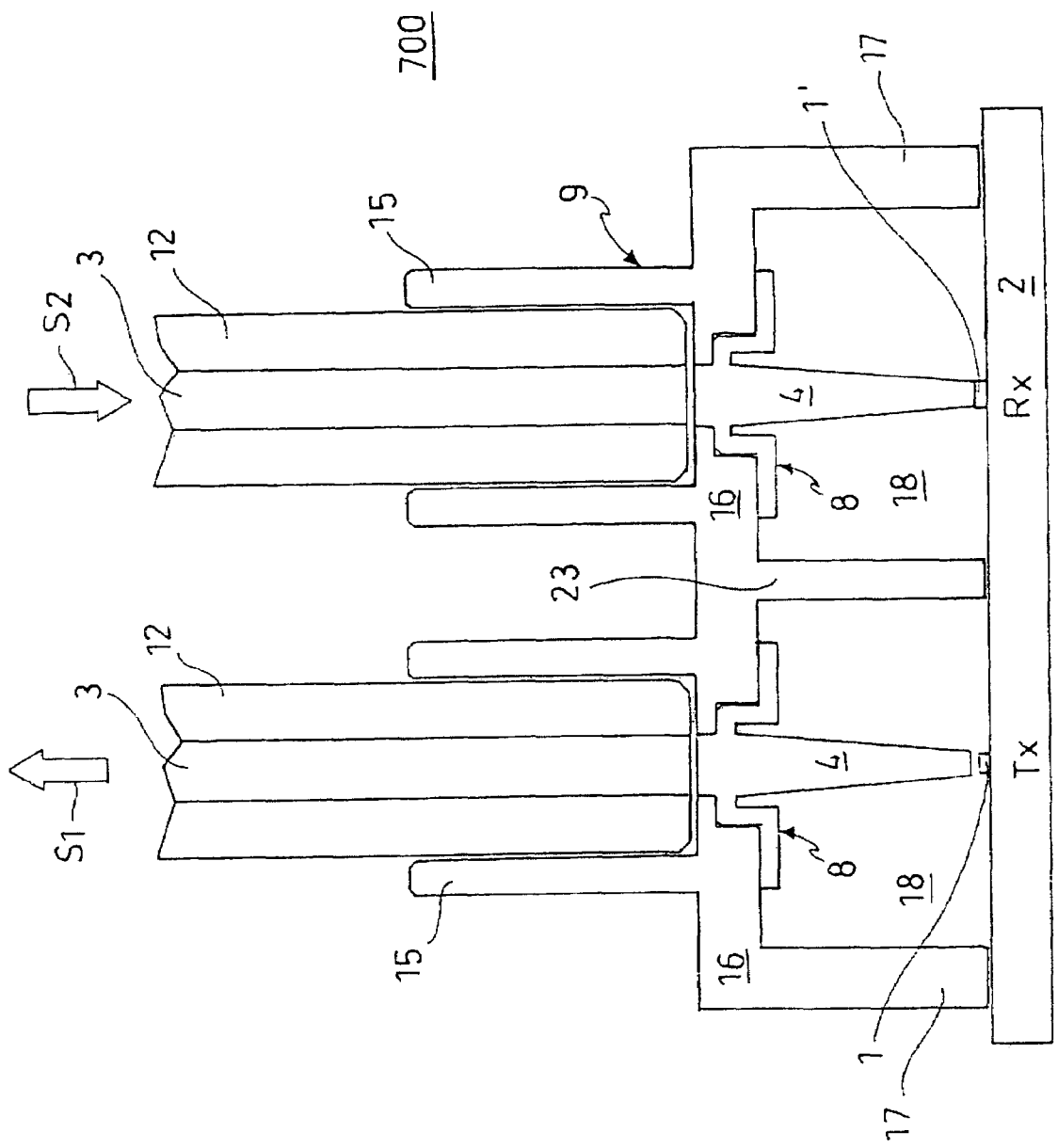
Figure 8:
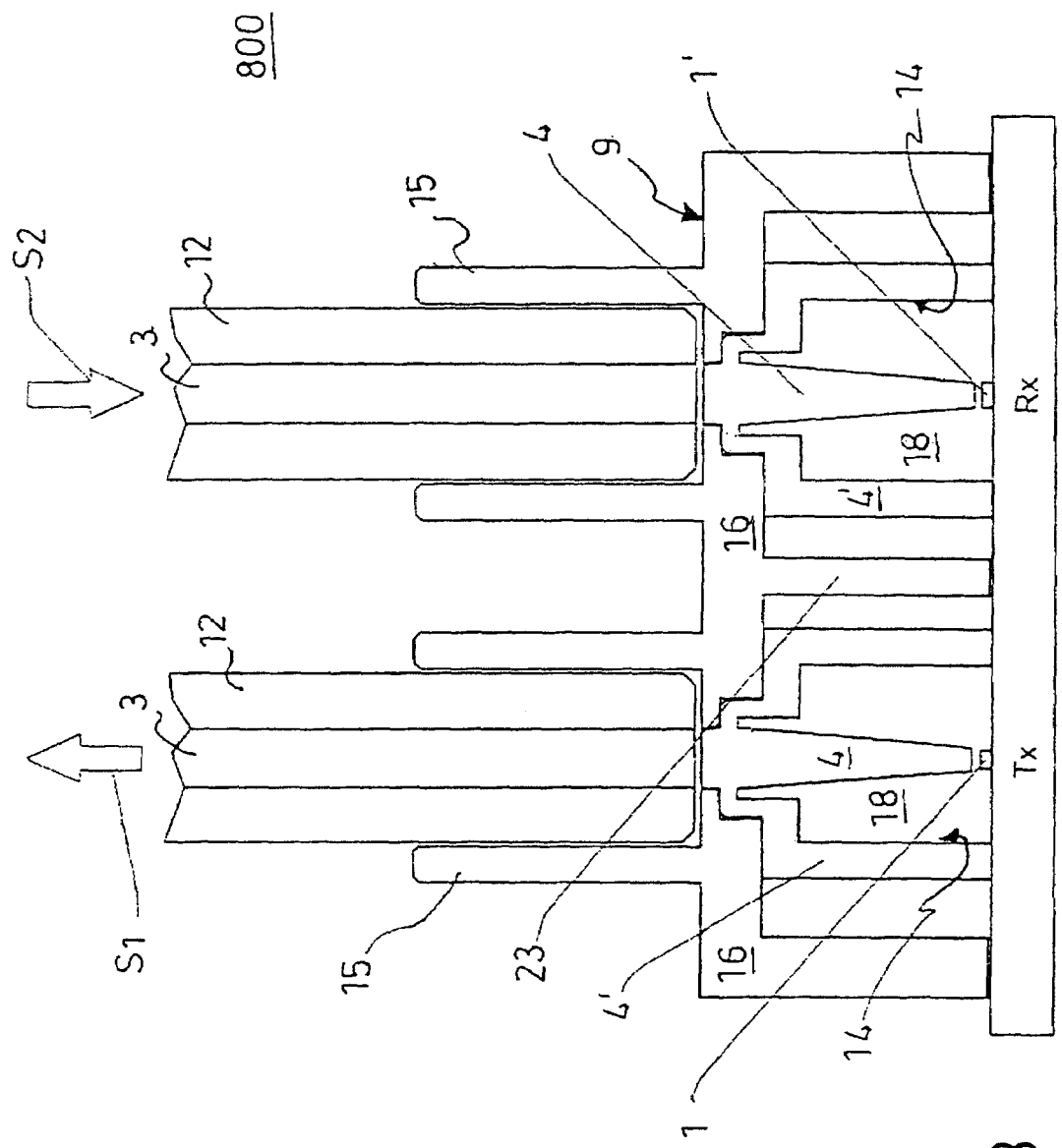
Figure 9:
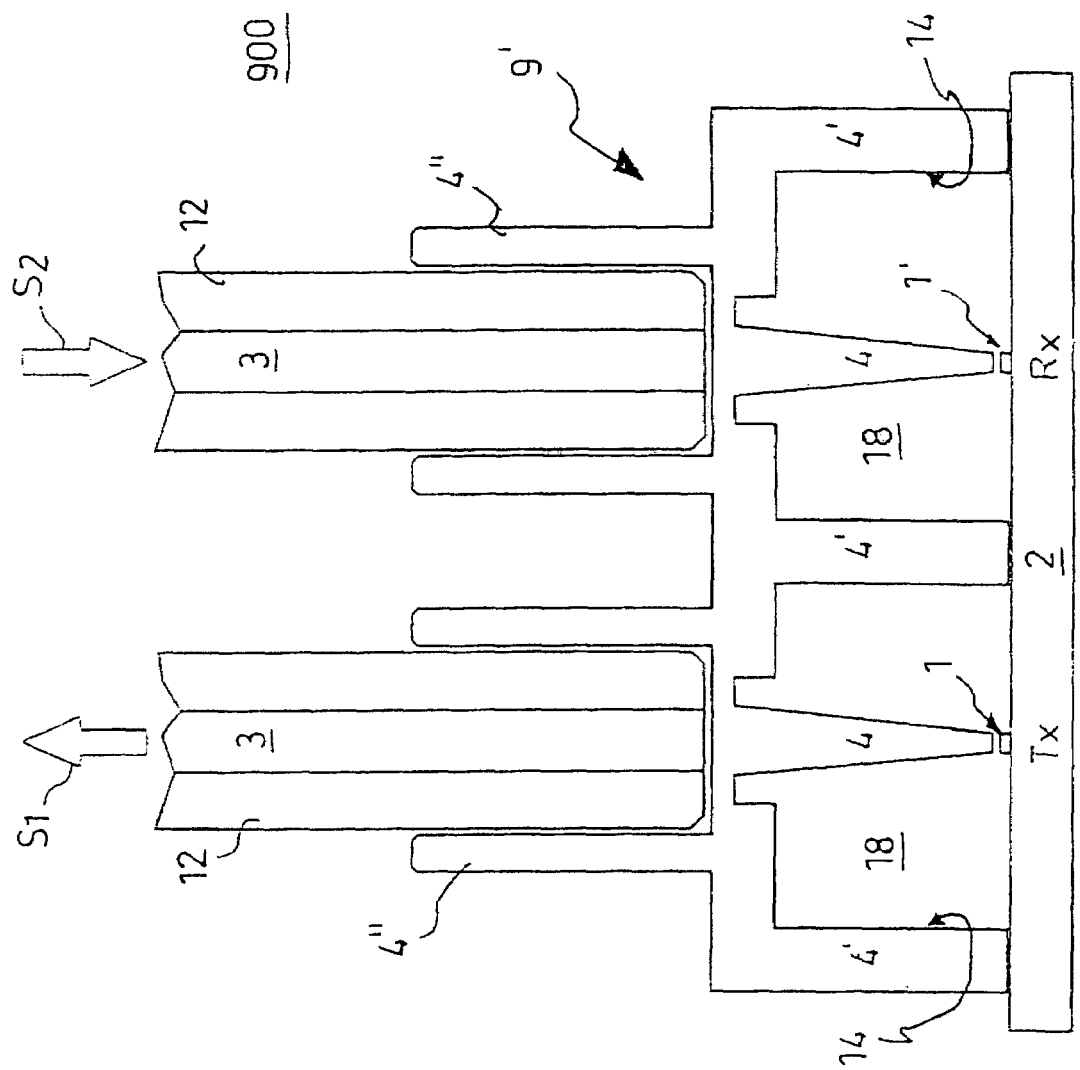

Contrary to the optical modules from FIG. 1-6 that are typically either a receiving type or transmitting type, the optical modules from FIGS. 7, 8, and 9 include both options. The optical modules from FIGS. 7, 8, and 9 include both a transmitting optoelectronic device 1 (Tx), and a receiving optoelectronic device 1' (Rx) that are optically coupled with a respective optical fibre 3 for a signal S1 to be transmitted and a further optical fibre 3 for an optical signal S2 to be received.

The seventh optical module 700 (FIG. 7), similar to that in FIG. 1, includes an individual structure 9 supporting both the guiding element 4 and the ferrule 12 being optionally provided with a wall or partition wall 23 of a material opaque to optical radiation. This partition wall 23 controls cross-talk between the guiding elements 4, the devices 1 and 1' and both optical fibres 3 of the transmitting and receiving parts and vice versa because it isolates the two inner regions 18 where the optical components are provided or are faced to.

Similar considerations relative to the provision of the partition wall 23 are valid for the eighth optical module 800 (FIG. 8) which includes two modules of a similar type as the second optical module 200 from FIG. 2.

Figure 4:
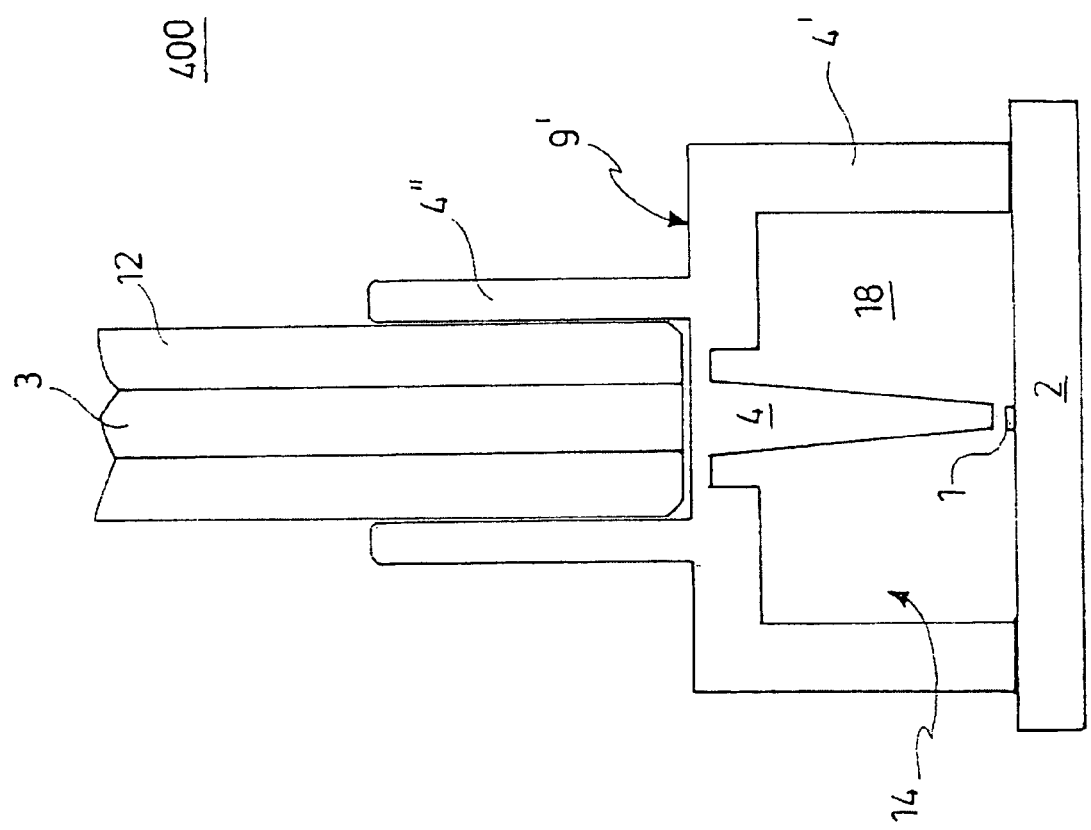

The ninth optical module 900 from FIG. 9 includes two optical modules similar to the fourth module 400 from FIG. 4 and includes a support structure for the two ferules 12 and the two guiding elements 4, which is made by moulding and enbloc.

Figure 5:
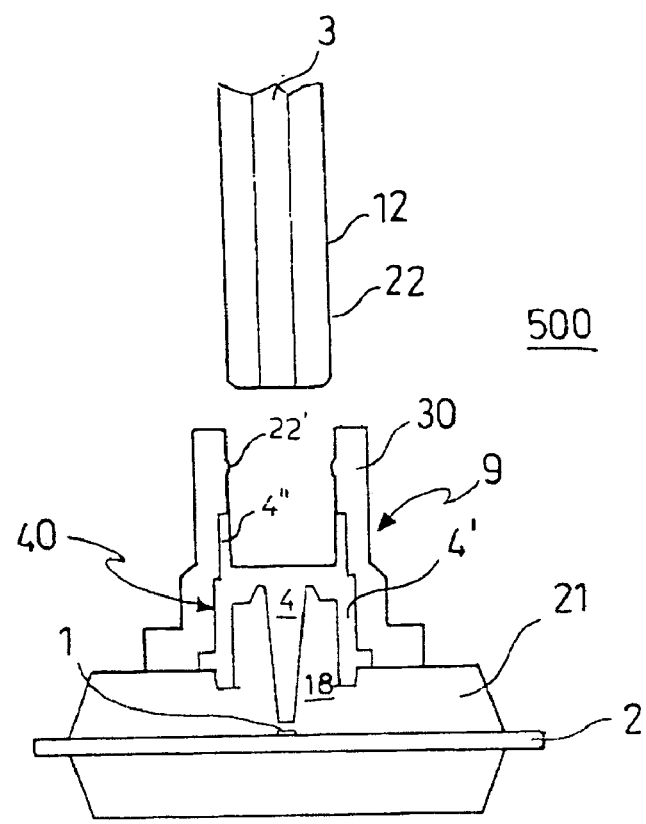
Figure 6:
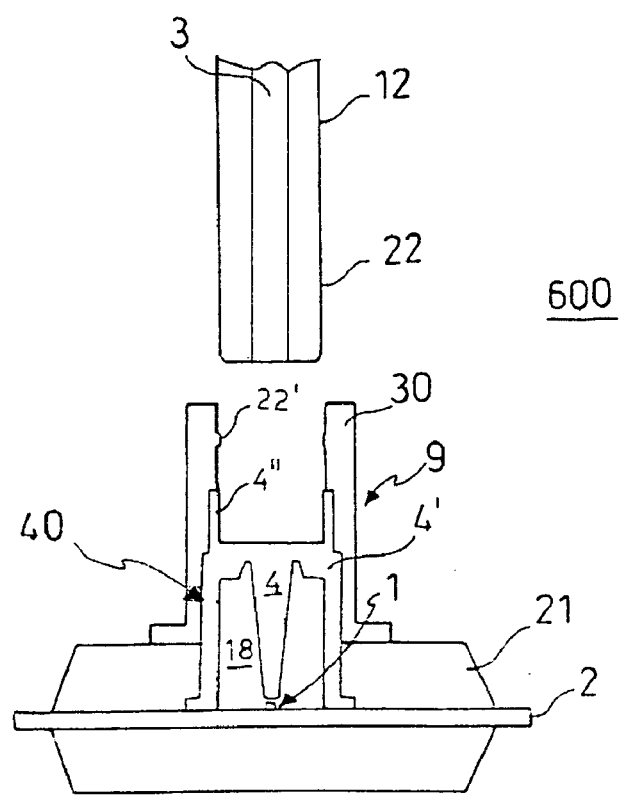
Figure 10:
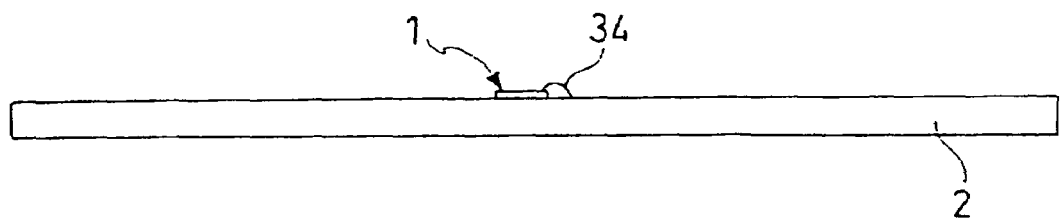
FIGS. 10-14 illustrate manufacturing and assembly steps of said fifth optical module from FIG. 5.

An example of the manufacturing process of the fifth optical module 500 will be now described (FIG. 5). FIG. 10 relates to the fixing of the optoelectronic device 1 to substrate 2, which can be carried out as described above with reference to the first optical module 100. The optoelectronic device 1 from FIG. 10, as well as that of other embodiments of the invention, is, for example, connected to the integrated circuitry of the substrate 2 with a connection wire (bonding wire).

Subsequently, by moulding including the matrixes 25 and 25', at least a part of the substrate 2 and a part of the device 1 is incorporated in a body 21 opaque to optical radiation. This body 21 is made of a material ensuring mechanical protection and seal against humidity, such as a phenolic resin belonging to the category of Epoxy Moulding Compounds (such as ECN-Epoxy Cresol Novolac). The moulding technique that can be used for this opaque body 21 is, for example, injection according to which the material to be used is injected in a liquid or semi-liquid phase between both matrixes 25 and 25'. After a cooling and hardening step, the moulded body 21 is released from both matrixes 25 and 25'.

Figure 12:
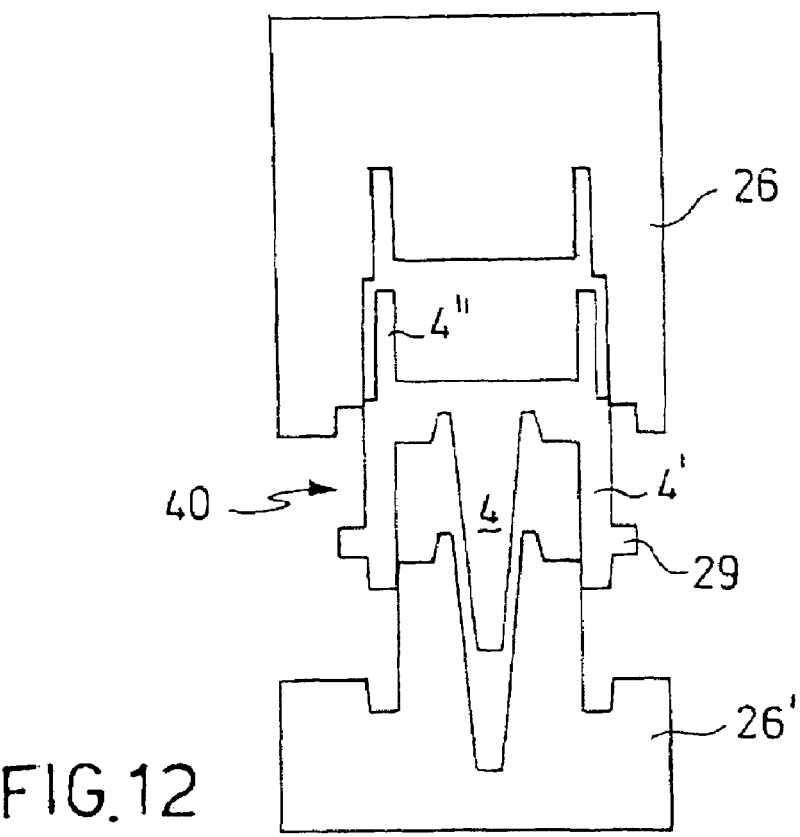

The moulded body 21 incorporates a part of the optoelectronic device 1 and leaves the device optical port open and has a free surface 42 intended to be mechanically coupled with the support wall 4' to which the guiding element 4 is joined. The manufacturing process provides a moulding step of a transparent structure 40 including the guiding element 4, the support wall 4' and the tubular mounting element 4" (made enbloc). FIG. 12 illustrates a mould of matrixes 26 and 26' suitable to the fabrication of the transparent structure 40. This moulding can be of the injection type (particularly when the material used is a fluoropolymer or a policarbonato) and provides the injection of the material in a liquid or semi-liquid form between the two matrixes 26 and 26' and a subsequent cooling and hardening step. After the hardening step, the transparent structure 40 is released from the mould 26-26' and can be subjected to a washing step. By providing moulds with high precision, it is possible to prevent or control the formation of burrs, and thus avoid or limit further processing of the moulded piece.

Figure 13:
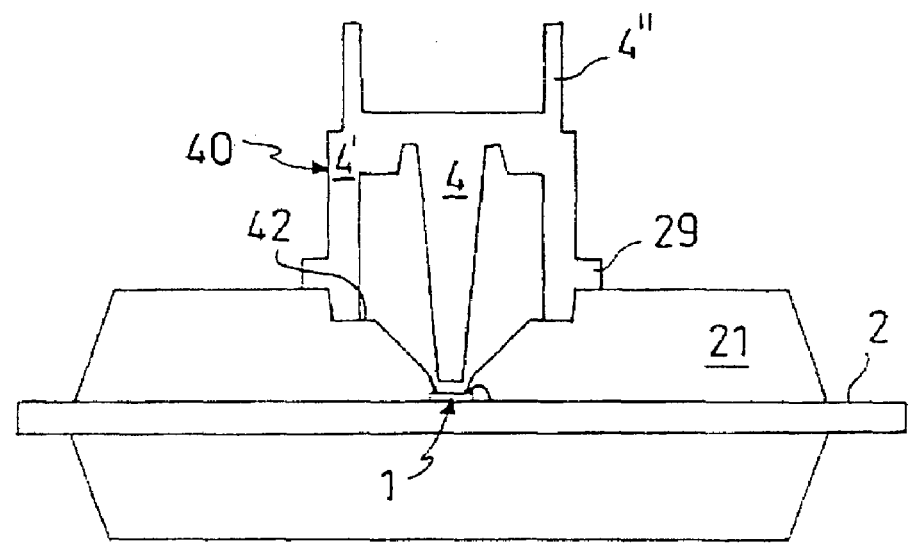

The support wall 4' of the structure 40 is provided with an outer rib 29 suitable to be geometrically coupled with the free surface 42 of the moulded body 21, in a mounting step as illustrated in FIG. 13. Fixing the transparent structure 40 resulting from the moulding to the moulded body 21 can be carried out by bonding. This step of mounting the transparent structure 40 can be carried out in a passive manner (e.g., with the device 1 off) and also without using a particularly precise pick-and-place equipment. In fact, the transparent structure 40, and advantageously, also the opaque body 21 (the structure 40 being fixed thereon) have predetermined geometries that can be obtained, in practice, with high precision due to the use of moulding, thereby allowing the relative proper positioning. Furthermore, the lower portion of the transparent structure 40 and that of the free surface 42 of the opaque body 21 are shaped such as to provide a high-precision geometrical coupling.

Figure 14:
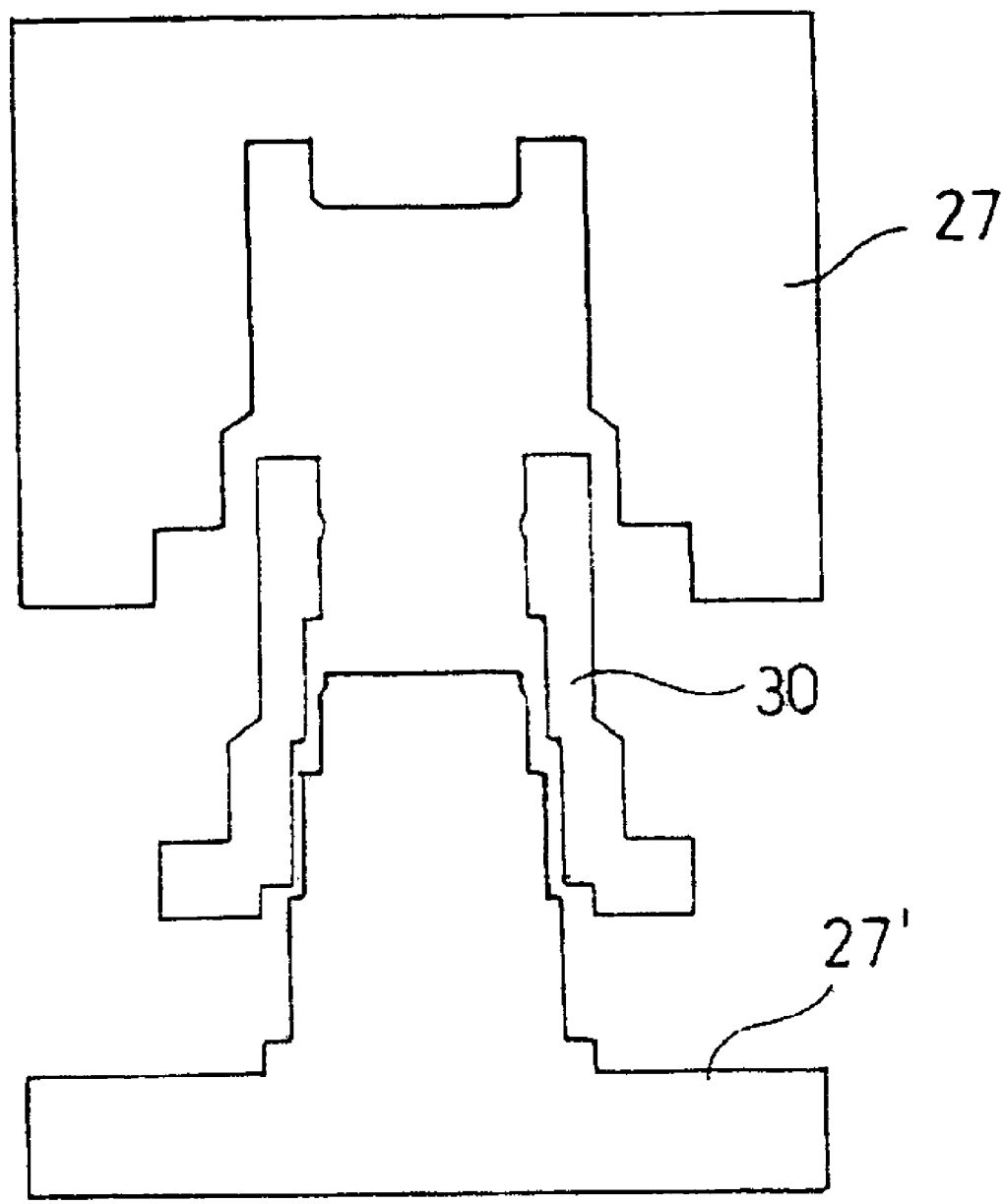

FIG. 14 relates to a moulding step (for example of the injection type) that can be carried out by use of a mould of matrixes 27 and 27', of a reinforcement structure 30 suitable to be externally coupled with the transparent structure 40 and, together with the latter, locate the housing for the ferrule 12 to be inserted therein, such as shown in FIG. 5. The reinforcement structure 30 is provided with an inner rib 22' that facilitates holding the ferrule 12 in position having a further circular rib 22. The reinforcement structure 30 can be made of "black" plastic, e.g., opaque to optical radiation.

Figure 16:
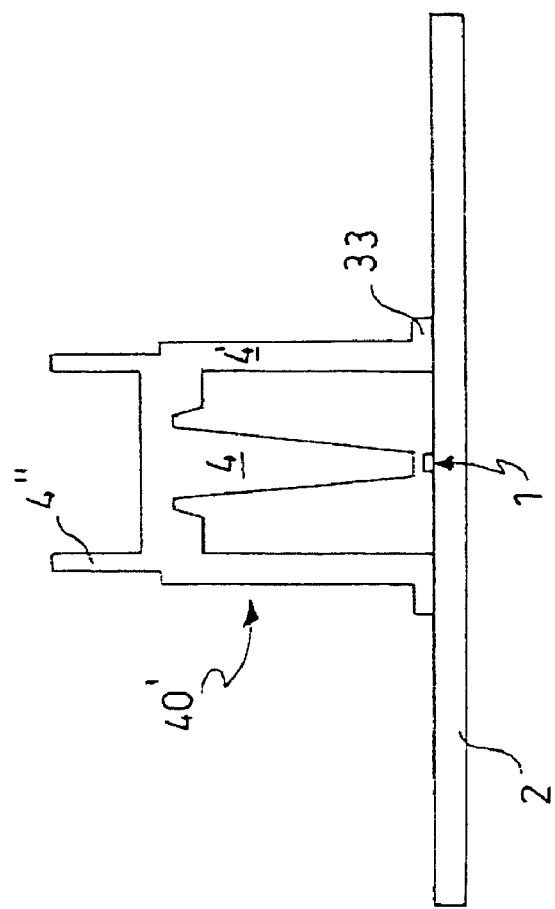
FIGS. 15-17 illustrate manufacturing and assembly steps of said sixth optical module from FIG. 6.
Figure 15:
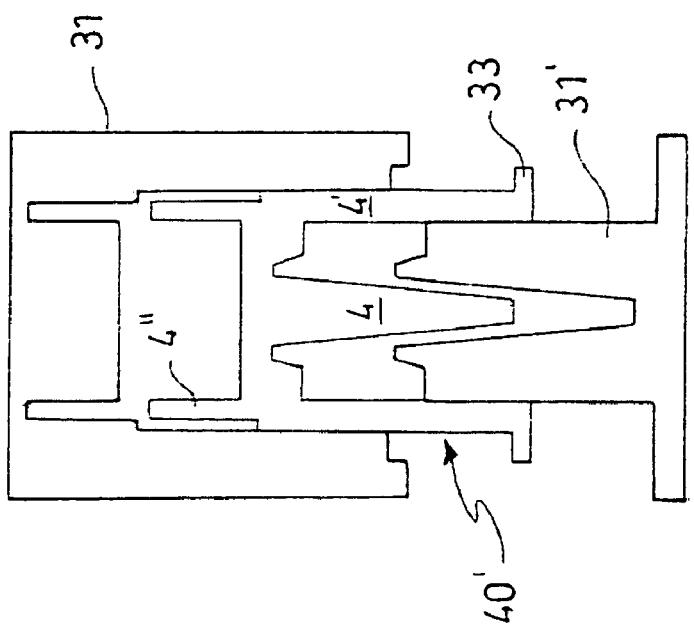
Figure 17:
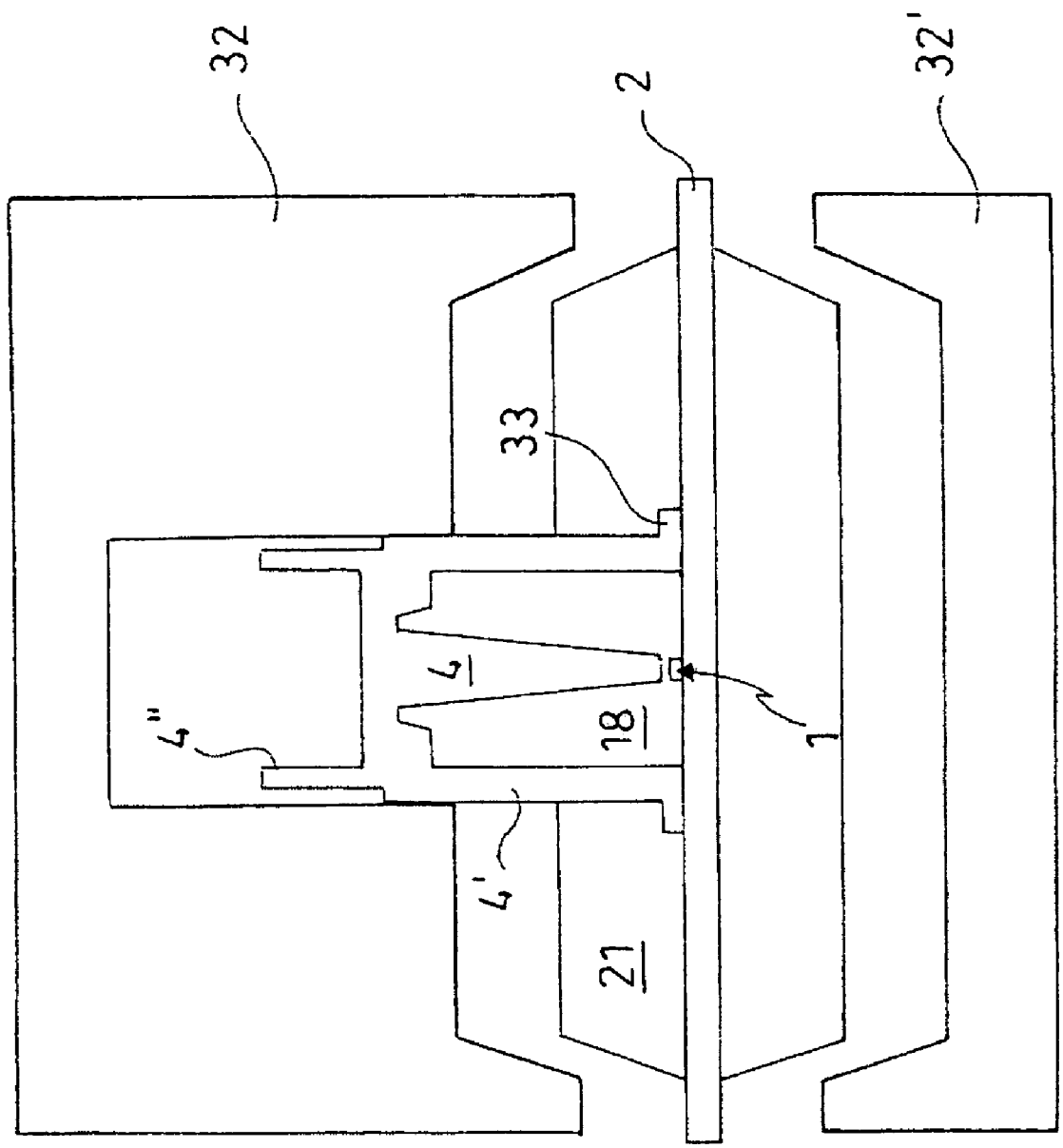

FIGS. 15, 16, and 17 relate to several manufacturing steps of the sixth optical module 600. For this module 600, the transparent structure 40' is fixed to the substrate 2 (FIG. 16). The transparent structure 40' includes as enbloc the guiding element 4, the support wall 4', and the tubular wall 4" and can be obtained, for example, by injection moulding (matrixes 31 and 31', from FIG. 15).

Figure 11:
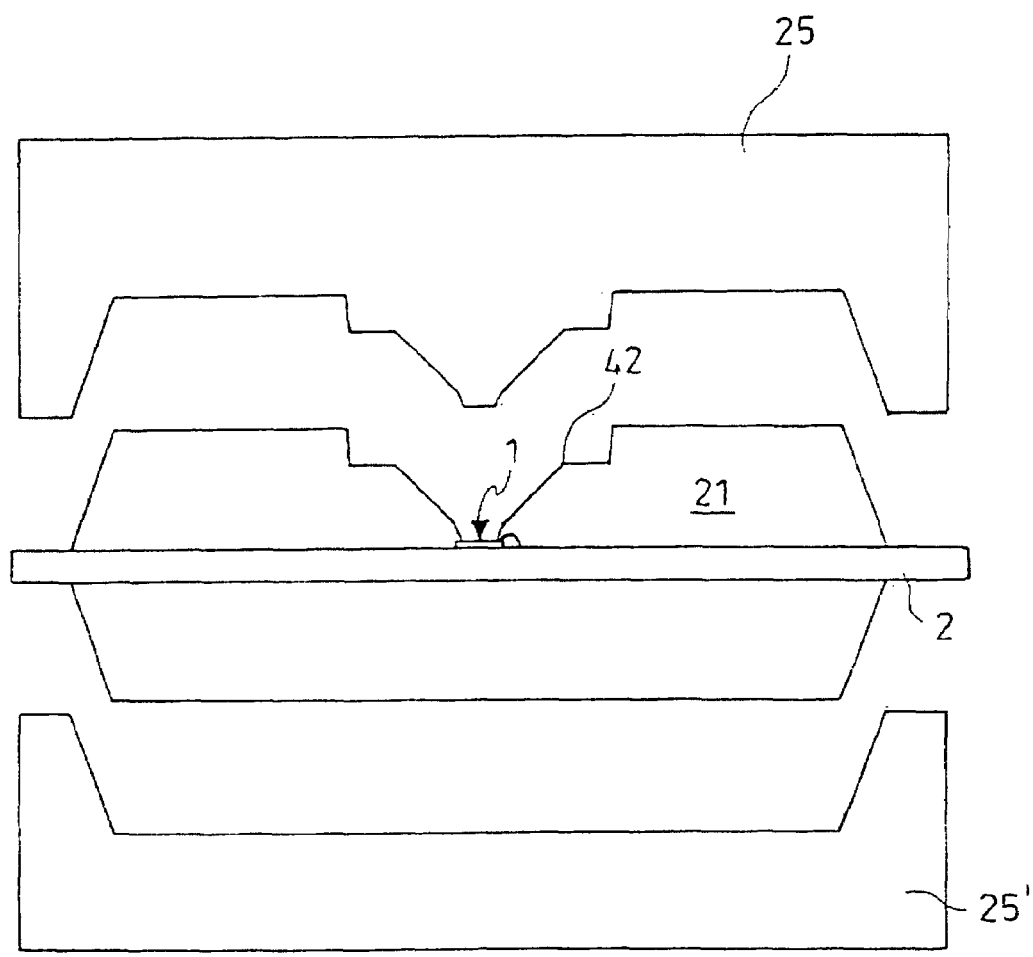

As illustrated in FIG. 17, the opaque body 21 that incorporates part of the substrate 2 and fixes the transparent structure 40 in position by acting on an outer circular flange 33 thereof is obtained by injection moulding with two matrixes 32 and 32'. The sixth optical module 600 (FIG. 6) is also provided with a reinforcement structure 30 (that can be obtained by moulding) applied outside the transparent structure 40. It should be observed that, in this case, the opaque body 21 does not incorporate part of the optoelectronic device 1 and, accordingly, the respective moulding step is less critical than that from FIG. 11, since avoiding to coat the optical port 20 of device 1 with the opaque resin is easier.

The optical modules 100-900 in accordance with the present invention are, for example, useful in "automotive" applications where the need of increasing the coupled optical power in the fibre is particularly felt, in order to enable high bit rate data transmission while keeping low transceiver costs. For the same reasons, the inventive optical modules can be also advantageously used in domotics.

The Applicant has provided a receiving optical module and a transmitting optical module similar to the first optical module of FIG. 1 and has taken test measurements in order to characterize the performance thereof. The LED and PIN in both optical modules used in the tests operated at a 650 nm wavelength. The optical fibre 3 used was a standard plastic optical fibre (standard POF). The transmitting module included a guiding element 4 having an optical port 7 of 240 μm diameter, a 6900 μm length, and an LED having a circular optical port 2080 of μm diameter.

For the receiving optical module a PIN having a circular optical port 20 of 420 μm diameter, a guiding element 4 having the optical port 6 of 410 μm diameter, a 5500 μm length, and the optical port 7 of 240 μm diameter. Both for the receiving and the transmitting module, the transparent component or medium 18 used was air (refractive index of 1). For these measurements, the Applicant compared the receiving module and the transmitting module of the type of first module 100 with an optical module of the conventional type (e.g., without the guiding element 4) in which the fibre POF faces the respective optoelectronic device 1 (with air being interposed therebetween) and is arranged about 120 µm away from the latter.

Figure 18A:
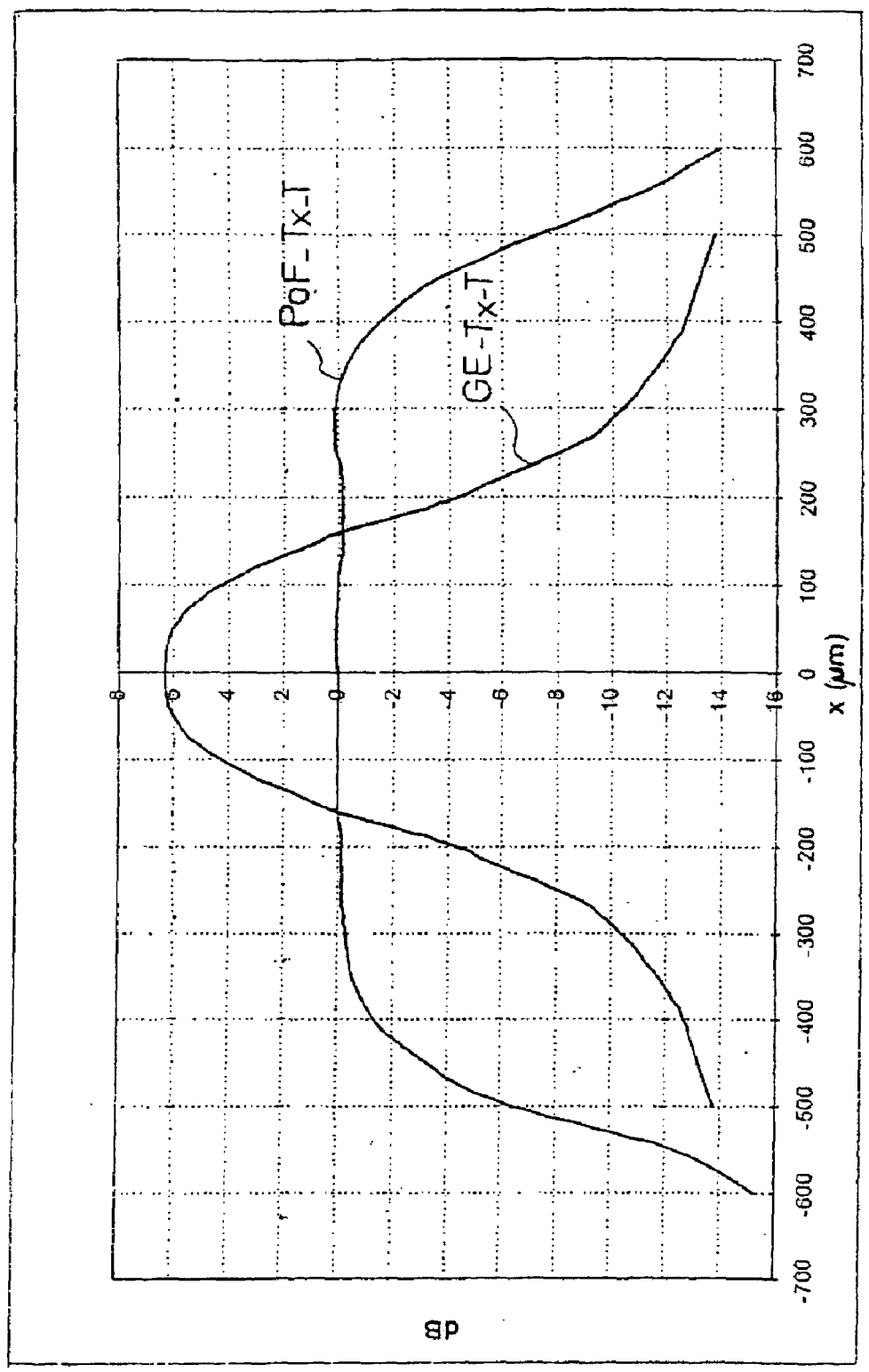
FIGS. 18A-18B relate to diagrams indicating the transversal and longitudinal mechanical tolerance, respectively, for an optical module of the transmitting type similar to the first module and for a conventional optical module.
Figure 18B:
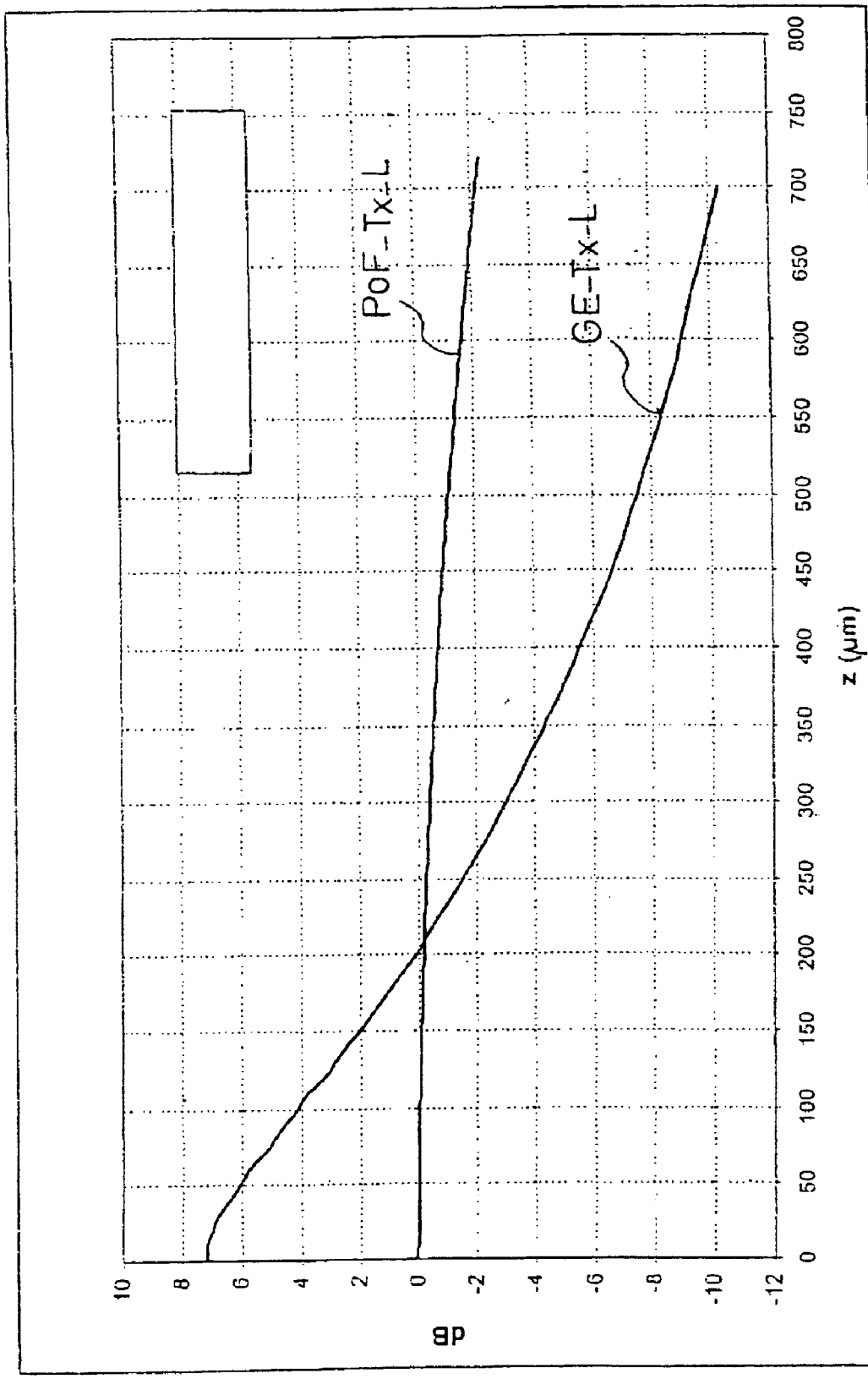

FIGS. 18A and 18B relate to the first optical module 100 of the transmitting type and illustrate a comparison between this module 100 and the conventional module, as regards the transversal tolerance (FIG. 18A) and longitudinal tolerance (FIG. 18B). Particularly, the diagram from FIG. 18A indicates on the X-axis the decibel coupling between the LED 1 and the optical fibre 3 and on the Y-axis the misalignment between the optical components (fibre 3, guiding element 4, and optical port 20) to be coupled, as evaluated along an axis orthogonal to the propagation axis of the optical radiation. In FIG. 18A, the curve CE-Tx-T (CE means Coupling Element) relates to the first transmitting module 100, whereas the figure POF-Tx-T relates to the conventional transmitting module.

It should be observed that for transversal misalignments ranging between about −160 µm and +160 µm, the transmitting module 100 in accordance with the invention has coupling values (CE-Tx-T curve) higher (up to max 6 dB) than those that can be obtained with the conventional module (POF-Tx-T curve).

The diagram from FIG. 18B (longitudinal tolerance) indicates on the X-axis the decibel coupling between the LED 1 and the optical fibre 3 and on the Y-axis the relative distance between the optical components (fibre 3, guiding element 4, optical port 20) to be coupled, as evaluated along the propagation axis of the radiation.

In FIG. 18B, the curve CE-Tx-L relates to the transmitting module 100, whereas the figure POF-Tx-L relates to the conventional transmitting module. It should be observed that, for longitudinal misalignments less than about 200 µm, the first module 100 in accordance with the invention has coupling values (CE-Tx-L curve) higher (up to max 7 dB) than those that can be obtained with the conventional module (POF-Tx-L curve).

Figure 19A:
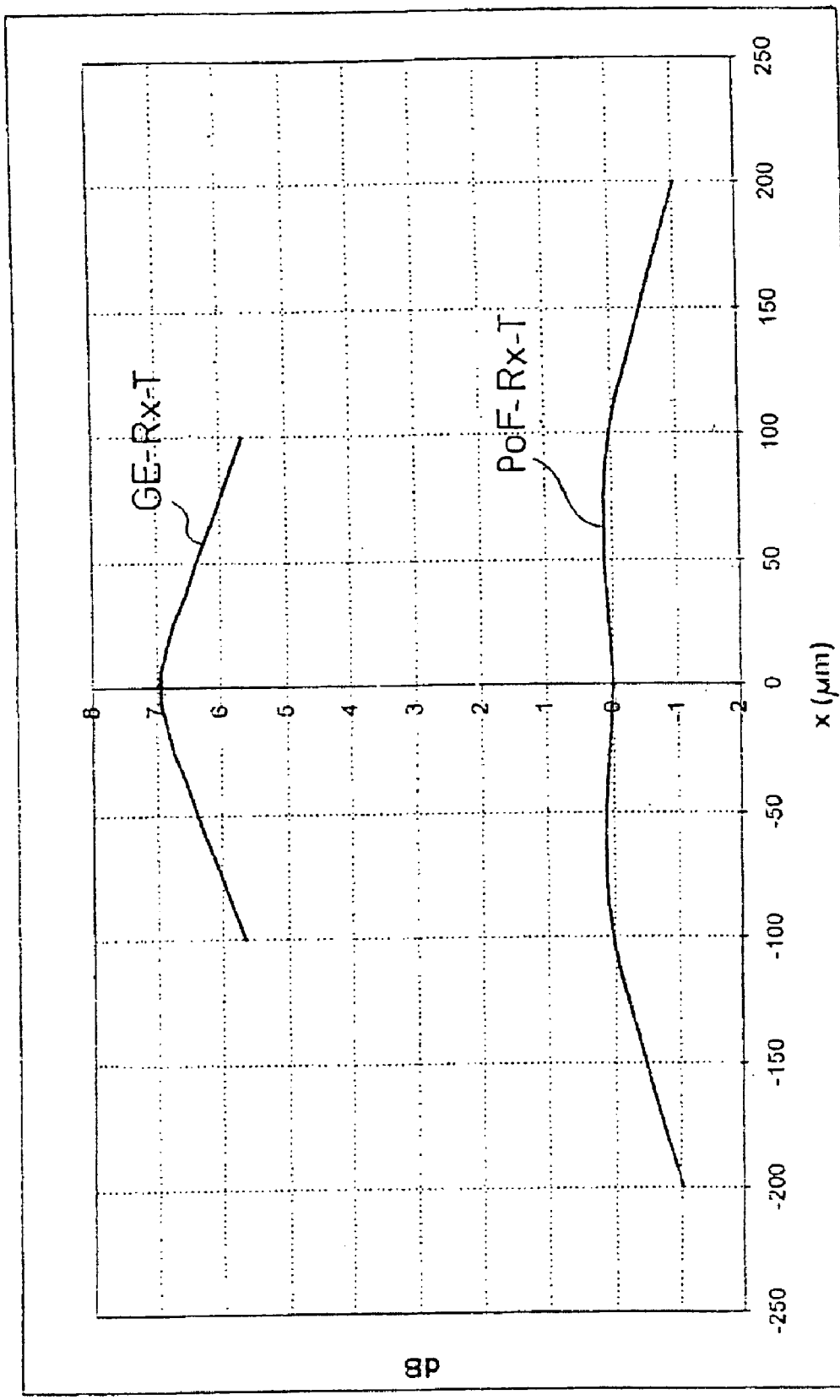
FIGS. 19A-19B relate to diagrams indicating the transversal and longitudinal mechanical tolerance, respectively, for an optical module of the receiving type similar to the first module and for a conventional optical module.
Figure 19B:
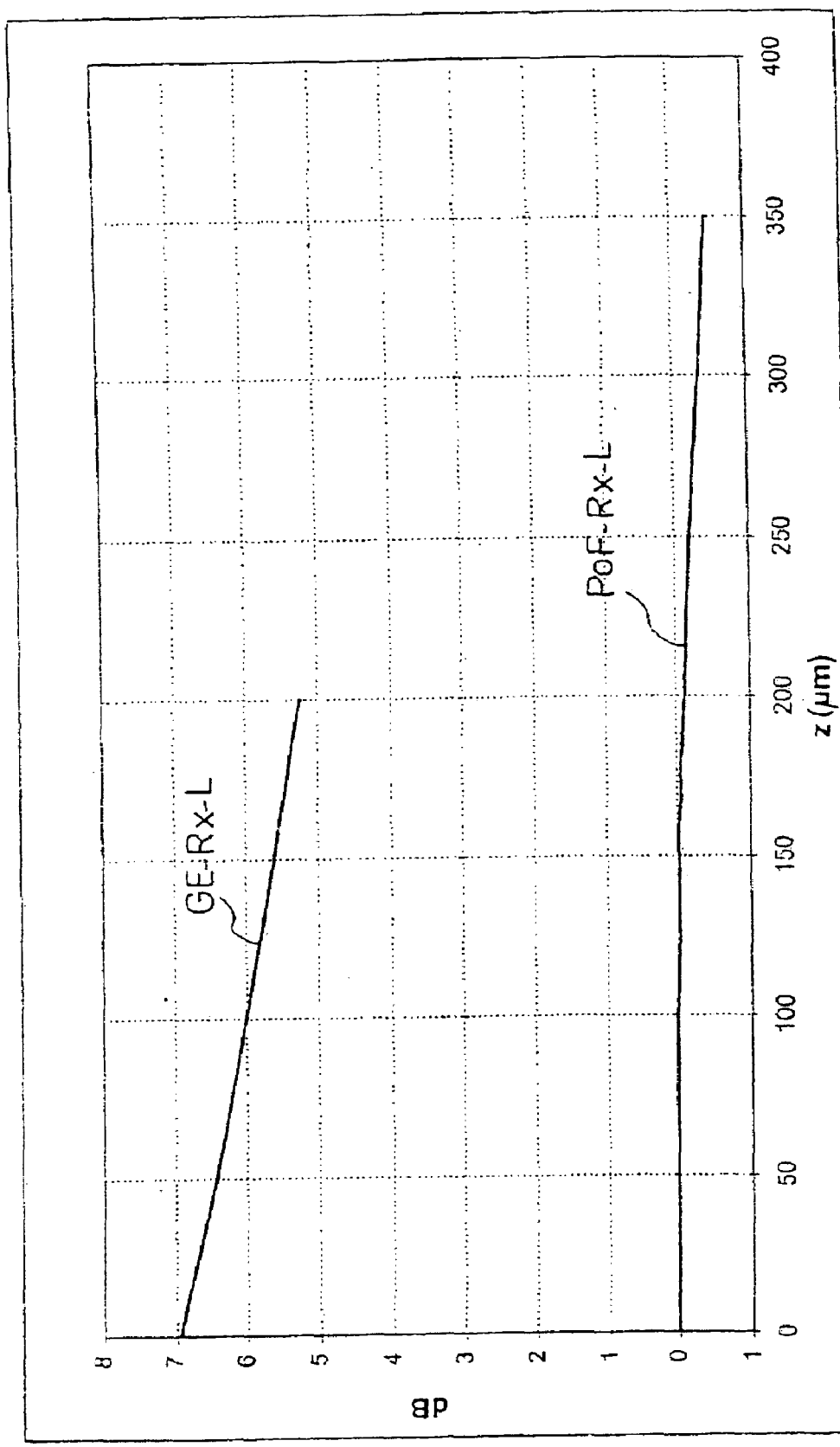

FIGS. 19A and 19B relate to the comparison between a receiving module similar to the first module 100 and a receiving module of the conventional type (air-facing POF fibre with a PIN). FIG. 19A relates to the transversal tolerance and shows the CE-Rx-T curve relative to the first receiving module 100 and the POF-Rx-T curve relative to the conventional receiving module. FIG. 19B relates to the longitudinal tolerance and shows the CE-Rx-L curve relative to the first receiving module 100 and the POF-Rx-L curve relative to the conventional receiving module.

The curves from FIGS. 19A and 19B, as well as 18A and 18B, illustrate that the receiving module 100 has a better performance than the conventional one (about 6-7 dB optical coupling maximum increase as compared with the conventional module) within a wide misalignment range.

It should be observed that the measurements stated above relate to a structure similar to FIG. 1, in which air is provided between the optical port 7 of the guiding element 4 and the optical port 20 of the optoelectronic device 1 and resin is not interposed therebetween.

Figure 20A:
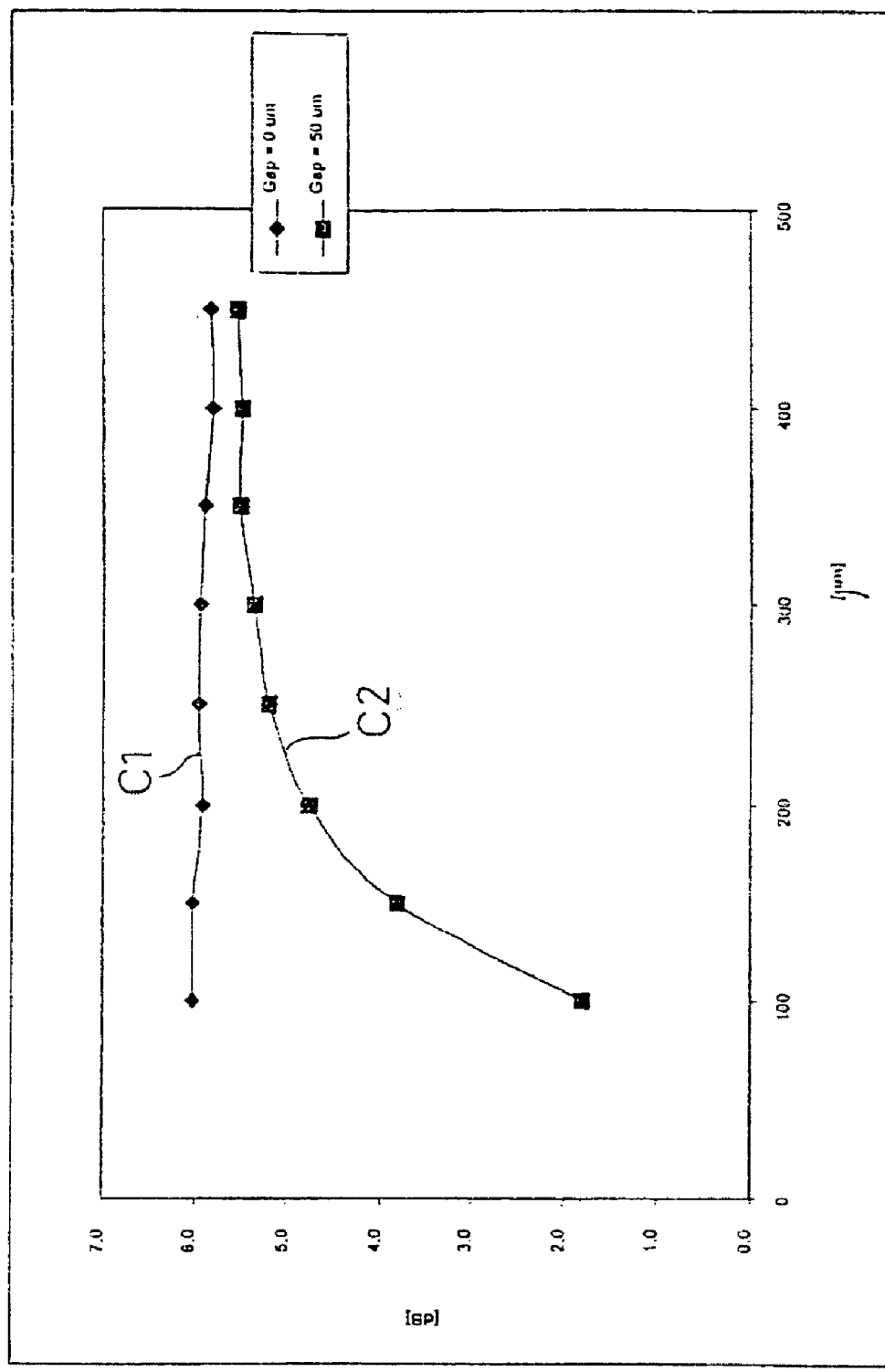
FIG. 20A illustrates two trends of the coupling efficacy for two different separation distances between a guiding element and an optoelectronic device that are contained in said first module in the presence of interposed air.

The diagram from FIG. 20A shows the gain in coupling efficacy of the first module 100 as compared with that of the conventional module (Y-axis), in the case where air is interposed between the guiding element 4 and the LED 1, as a function of the diameter (X-axis) of the optical port 7 of the guiding element 4.

In FIG. 20A, there is plotted a test curve C1 (rhombs) illustrating the case where a practically null distance (Gap=0) is provided between the optical port 7 of the guiding element 4 and the optical port 20 of the LED 1. Furthermore, in FIG. 20A, there is plotted another curve C2 (squares) illustrating the coupling efficacy when the ports 7 and 20 are arranged at a distance of 50 µm (Gap=50 µm). By comparing the curves C1 and C2 we noticed that with a diameter of the optical port 7 exceeding about 200 Am, the curve C2 has a gain comparable to that of curve C1 and, accordingly, the presence of interposed air by a length of 50 µm does not seem to be detrimental.

It has been noted that by using the resin 19 (FIG. 2) with a suitable refractive index (for example, 1.56), in the case of module 100 of the transmitting type, the coupling efficacy can be further increased to an extent depending on several factors:

- size and shape of the active area of LED 1 (port 20);
- diameter of the end section (port 7) of the guiding element 4;
- distance between the port 7 of the guiding element 4 and the active area or optical port 20 of LED 1;
- shape of the guiding element 4 (intended as the ratio of the length to the tapering factor, and in the second approximation the type of curve used for tapering);
- refractive index of the resin 19; and
- by increasing the index value, the value of photon extraction from the LED is increased.

Figure 20B:
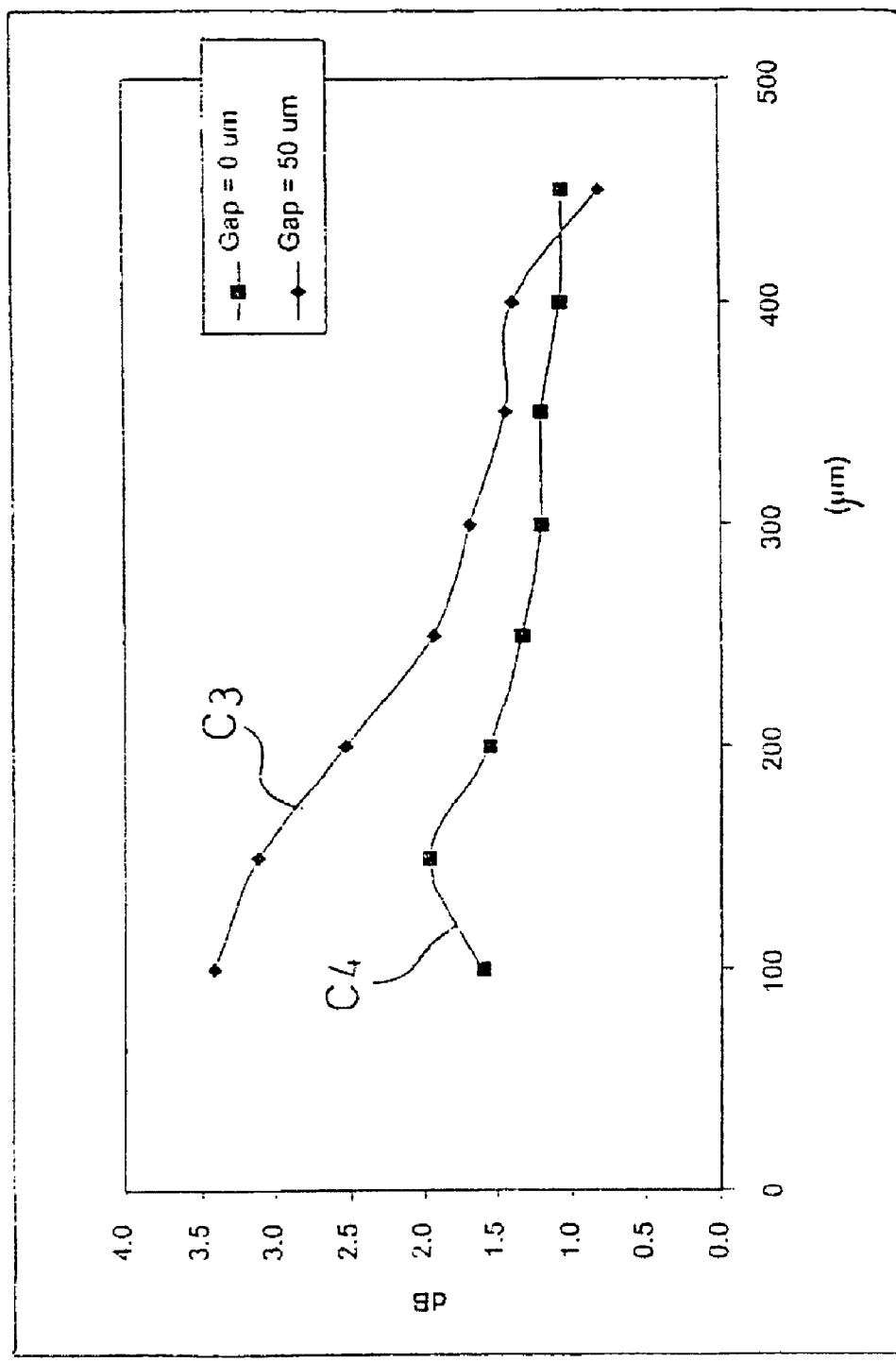
FIG. 20B illustrates two trends of the increase in the coupling efficacy for the two above embodiments of an optical module similar to said first module in the presence of a clear resin interposed between an optoelectronic device and a guiding element.

FIG. 20B illustrates a diagram concerning the first module 100 of the transmitting type in which there is plotted the increase in the coupling efficacy (Y axis) due to the presence of the coupling element 19 (a transparent resin) as a function of the diameter (X axis) of the optical port 7 of the guiding element 4. In FIG. 20B is plotted the curve C3 (rhombs) relating to the case where the distance is practically null (Gap=0) between the optical port 7 of the guiding element 4 and the optical port 20 of the LED 1. In FIG. 20B there is further illustrated the curve C4 (squares) concerning the case where the optical ports 7 and 20 are arranged at a distance of 50 µm (Gap=50 µm).

From the comparison between the curves C3 and C4, it results that the advantage of filling the gap with the coupling element 19 is greater with small diameter values of the optical port 7 of the guiding element 4, the gain relative to the optical fibre 3 being nevertheless low. In addition, it should be noted that with greater gaps (curve C3), the increase in the coupling efficacy due to the introduction of the coupling element 19 is more evident.

In the particular case of the first module 100 of the receiving type, it has been noticed that the introduction of resin 19 does not affect the coupling efficacy in an important manner. This resin 19, however, is advantageous in that it increases the mechanical grip of the module as a whole.

The teachings of the present invention have several advantages. In fact, by using a moulded and tapered guiding element, one can obtain high coupling values between the optical fibre and the optoelectronic device (for example, a LED or a PIN) with a manufacturing process of the optical module that is based on non-complex technologies (such as moulding, preferably by injection) and makes use of inexpensive materials, thereby resulting in a device whose manufacture is fully consistent with mass production.

As regards high performance in terms of coupling, it should be noted that the tapered guiding element 4 being interposed between the optical fibre 3 and the optoelectronic device 1 allows the minimization of the propagation tracts in the air, thus reducing the back reflections of the optical radiation that are detrimental to the coupling. Furthermore, the inventive solution has a good tolerance both from the point of view of the mechanical size of the individual components and from the point of view of the alignments of the same components.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention as hereinafter claimed.

The invention claimed is:

1. An optical module comprising:
   a waveguide for the propagation of optical radiation;
   an optoelectronic device arranged on a substrate;
   means for coupling of the optical radiation between the waveguide and the optoelectronic device, the coupling means including a moulded guiding element tapered in a radiation propagation direction; and
   a moulded body opaque to said radiation and incorporating at least part of said substrate mechanically coupled with the guiding element and the waveguide.

2. The optical module according to claim 1, wherein said guiding element is made of material selected from the group consisting of plexiglas, fluoropolymers, polycarbonates, and mouldable glasses.

3. The optical module according to claim 1, wherein the waveguide is provided with a first optical port having a first size and the optoelectronic device is provided with a second optical port having a second size distinct from the first size and further wherein the guiding element extends along a substantially rectilinear radiation propagation axis and has opposite ends facing the first and second ports.

4. The optical module according to claim 3, wherein the first size is greater than the second size and the tapered guiding element narrows from the guide towards the device.

5. The optical module according to claim 3, wherein said guiding element is provided, at one end thereof, of a third optical port facing the first optical port and, at an opposite end, a fourth optical port facing the second optical port.

6. The optical module according to claim 5, wherein between the third optical port and the first optical port there is interposed a first layer of material transparent to optical radiation which mechanically joins the waveguide to the guiding element.

7. The optical module according to claim 5, wherein between the fourth optical port and the second optical port there is interposed a second layer of material transparent to optical radiation which mechanically joins the guiding element to the device.

8. The optical module according to claim 1, wherein the tapering of the guiding element is selected from the group consisting of linear, parabolic, and higher order tapering.

9. The optical module according to claim 1, further comprising a support structure supporting the waveguide, mechanically connected to the substrate, and defining an inner region, wherein the guiding element extends therein and an optical port of the optoelectronic device opens thereto.

10. The optical module according to claim 9, wherein said support structure comprises a medium transparent to the optical radiation and arranged directly in contact with the guiding element and having a lower refractive index than the guiding element.

11. The optical module according to claim 10, wherein said transparent medium is a transparent resin.

12. The optical module according to claim 10, wherein said transparent medium is air.

13. The optical module according to claim 1, wherein the waveguide is an optical fibre.

14. The optical module according to claims 13, wherein the refractive index of the guiding element ranges between that of a core of the optical fibre and that of a port of the optoelectronic device.

15. The optical module according to claim 1, wherein said moulded body is made of a material ensuring mechanical protection and seal against humidity.

16. The optical module according to claim 1, wherein said moulded body is made of phenolic resin belonging to the category of epoxy moulding compounds.

17. The optical module according to claim 9, wherein said support structure rests on the moulded body.

18. An optical module comprising:
   a waveguide for the propagation of optical radiation;
   an optoelectronic device arranged on a substrate;
   a coupling mechanism coupling the optical radiation between the waveguide and the optoelectronic device, the coupling mechanism including a moulded guiding element tapered in a radiation propagation direction, wherein the waveguide has a first optical port having a first size and the optoelectronic device has a second optical port having a second size distinct from the first size and further wherein the guiding element extends along a substantially rectilinear radiation propagation axis and has opposite ends facing the first and second ports; and
   a support structure supporting the waveguide, mechanically connected to the substrate, and defining an inner region, wherein the guiding element extends therein and the second optical port opens thereto, wherein the support structure comprises a frame that can be mechanically coupled with the guiding element and is provided with a mechanism suitable to be mechanically coupled with said waveguide for the latter to be supported in the aligned position with the guiding element.

19. The optical module according to claim 18, wherein the support structure includes a support body for the guiding element being provided with at least one wall defining the inner region, the support body being enbloc with said guiding element.

20. The optical module according to claim 19, wherein said at least one wall defines a cavity in which the guiding element is extended.

21. The optical module according to claim 19, wherein said at least one wall is provided with a base resting on said substrate.

22. The optical module according to claim 19, wherein the support body includes a fixing element made en bloc with the guiding element suitable to be mechanically coupled with said waveguide for the latter to be supported and hold in the aligned position with the guiding element.

23. The optical module according to claim 22, wherein the fixing element is of a tubular shape and defines a housing seat for the waveguide resulting aligned with the guiding element.

24. The optical module according to claim 23, including a ferrule, at least one end tract of the waveguide being housed therein.

25. The optical module according to claims 24, wherein the ferrule is inserted in said housing seat of the fixing element.

26. The optical module according to claim 18, wherein an optical radiation shield is arranged externally of the support structure.

27. The optical module according to claim 18, wherein said frame is made of a shielding material against optical radiation.

28. The optical module according to claim 18, wherein said coupling mechanism comprises a tubular body defining a respective housing seat for the waveguide which is aligned with the guiding element.

29. The optical module according to claim 18, wherein said frame is provided with a support wall having a base resting on said substrate.

30. The optical module according to claim 18, wherein said optoelectronic device is an optical radiation transmitter or an optical radiation receiver.

31. The optical module according to claim 30, wherein the radiation transmitter is an LED diode (Light Emitting Diode) and the optical radiation receiver is a PIN diode.

32. The optical module according to claim 18, wherein on said substrate there is fixed a further optoelectronic device and the support structure further comprises means for supporting and fixing:
- a further waveguide for the propagation of optical radiation,
- a further moulded and tapered guiding element in a radiation propagation direction for coupling the optical radiation between the further waveguide and the further device.

33. The optical module according to claim 32, wherein said support structure comprises an opaque element separating the inner cavity from a further inner cavity in which the further guiding element runs.

34. A manufacturing process for an optical module comprising the steps of:
- providing a waveguide for the propagation of optical radiation;
- providing an optoelectronic device mounted on a substrate;
- providing by moulding a guiding element for the optical radiation, wherein the guiding element is tapered in a propagation direction of the optical radiation; and
- assembling the waveguide, the substrate, and the guiding element such that the guiding element allows the optical radiation to be coupled between the optoelectronic device and the waveguide,
- wherein said moulding step includes moulding a support structure of the guiding element en bloc with the guiding element.

35. The process according to claim 34, wherein said step of moulding the support structure includes moulding a mounting element of said waveguide en bloc with the mounting structure.

36. The process according to claim 34, wherein said assembling step further comprises:
- mechanically coupling the support structure with the substrate such as to obtain said coupling of the optical radiation; and
- mounting the waveguide to the mounting element such as to obtain a coupling of the optical radiation between the waveguide and the guiding element.

37. The process according to claim 34, further including a further moulding step of a body opaque to said radiation such that said body incorporates at least part of said substrate; the moulding of the opaque body being carried out either before or after the step of fixing the support structure to the substrate.

38. The process according to claim 37, wherein said mechanically coupling of the support structure to the substrate includes coupling the support structure to the opaque body by geometrical coupling.

* * * * *